US012208409B2

(12) United States Patent
Karitonas et al.

(10) Patent No.: US 12,208,409 B2
(45) Date of Patent: Jan. 28, 2025

(54) INJECTION HEAD FOR EXCITATION OF FLUID

(71) Applicant: SPECIALIST HEALTH SOLUTIONS LIMITED, Kings Lynn (GB)

(72) Inventors: Tautvydas Karitonas, Kings Lynn (GB); Kurt Morgan, Kings Lynn (GB)

(73) Assignee: Specialist Health Solutions Limited (GB)

( * ) Notice: Subject to any disclaimer, the term of this patent is extended or adjusted under 35 U.S.C. 154(b) by 0 days.

(21) Appl. No.: 17/532,500

(22) Filed: Nov. 22, 2021

(65) Prior Publication Data

US 2022/0161291 A1 May 26, 2022

(51) Int. Cl.
*B05B 17/00* (2006.01)
*B05B 17/06* (2006.01)

(52) U.S. Cl.
CPC ...... *B05B 17/0646* (2013.01); *B05B 17/0676* (2013.01)

(58) Field of Classification Search
CPC . B05B 17/0646; B05B 17/0676; B05B 17/06; B05B 17/0607; B05B 17/063; B05B 17/0653; B05B 17/0615; B05B 15/50; B05B 15/60
See application file for complete search history.

(56) References Cited

U.S. PATENT DOCUMENTS 4,911,866 A 3/1990 Monroe
7,931,212 B2 * 4/2011 Urich .................. B05B 17/0646 239/602
8,540,169 B2 * 9/2013 Kambayashi ....... B05B 17/0646 239/102.1
2006/0226253 A1 10/2006 Wang et al.
(Continued)

FOREIGN PATENT DOCUMENTS

CN 110324985 B 5/2020
DE 102018120024 * 2/2020 ......... B05B 17/0646
(Continued)

OTHER PUBLICATIONS

European Search Report dated Apr. 13, 2022 issued in corresponding Patent Application No. 21209626.7 (12 pages).

*Primary Examiner* — Christopher R Dandridge
(74) *Attorney, Agent, or Firm* — Barnes & Thornburg LLP; Anusuya Das

(57) ABSTRACT

The invention provides a head for a fluid excitation device in which a transducer comprising a vibration generation portion and a fluid excitation portion is secured to a flexible substrate using an adhesive layer located between the vibration generation portion and the flexible substrate. An external force-applying structure is not needed to secure the vibration generation portion to the fluid excitation portion, removing a cause of significant vibration damping. Rather than damping the vibrations generated by the transducer, the flexible substrate instead itself moves in co-operation with
(Continued)

the transducer, reducing damping effects. The design and manufacture of this arrangement is relatively simple and no complex tuning is required to ensure efficient operation over the entire operational life of the head. The head can be used in a fluid excitation device such as an atomiser or ultrasonic bath.

17 Claims, 8 Drawing Sheets

(56) References Cited

U.S. PATENT DOCUMENTS

| | | | | |
|---|---|---|---|---|
| 2008/0006264 | A1* | 1/2008 | Gallem | A61M 15/0021<br>128/200.14 |
| 2008/0217430 | A1* | 9/2008 | Feriani | B05B 17/0646<br>239/102.1 |
| 2008/0308096 | A1* | 12/2008 | Borgschulte | A61M 11/005<br>128/200.14 |
| 2009/0159720 | A1* | 6/2009 | Fang | B05B 17/0646<br>310/358 |
| 2010/0213274 | A1* | 8/2010 | Yu | B05B 17/0646<br>239/102.2 |
| 2011/0315786 | A1 | 12/2011 | Kambayashi | |
| 2014/0336618 | A1 | 11/2014 | Wilkerson et al. | |
| 2016/0310981 | A1 | 10/2016 | Von Hollen | |
| 2018/0169713 | A1* | 6/2018 | Müller | B08B 3/10 |

FOREIGN PATENT DOCUMENTS

| | | | | | |
|---|---|---|---|---|---|
| EP | 3 127 616 | A1 | | 2/2017 | |
| JP | 59-52561 | | * | 3/1984 | B05B 17/06 |
| JP | 2011-104472 | A | | 6/2011 | |

* cited by examiner

Detail B

Detail C

INJECTION HEAD FOR EXCITATION OF FLUID

CROSS-REFERENCE TO THE RELATED APPLICATIONS

This application claims priority to Great Britain Patent Application No. 2018359.6, entitled "INJECTION HEAD FOR EXCITATION OF FLUID", filed Nov. 23, 2020, the contents of which is expressly incorporated by reference herein in its entirety.

FIELD OF THE INVENTION

The invention relates generally to injection heads for fluid atomisation devices, and more particularly to injection heads in which a vibration generation portion is fixed to a flexible substrate.

BACKGROUND

There are numerous scenarios in which it is desirable to generate excitations in fluid. This may be to produce droplets of fluid, often referred to as atomisation, so as to disperse the fluid into the surrounding atmosphere. This type of atomisation can be used for a number of purposes including disinfection, humidification and lubrication. The principle of operation remains largely the same in each case with the fluid being selected according to the task at hand.

Alternatively the fluid excitations can travel through a reservoir of the fluid without generating droplets. In this case the excitations within the fluid are the useful output, e.g. shockwaves to effect cleaning as in the case of an ultrasonic bath.

In these and other cases it is common to generate the excitations in the fluid using a transducer that convers electricity or an equivalent form of input into a vibrational output. A typical design of such a device includes a transducer comprising a piezoelectrical material and an atomisation plate, where the piezoelectric material and atomisation plate are pressed together via some type of external force-applying structure, e.g. a pair of external o-rings that clamp the piezoelectric material and atomisation plate together so that they remain in good contact with one another.

A problem with this type of arrangement is that it is often the case that a significant fraction of the energy generated by the piezoelectric material is lost to damping caused by the clamp; that is, the efficiency of the arrangement is relatively low. This can often manifest as a significant fraction of the area of the atomisation plate vibrating with insufficient amplitude to produce the desired droplets or fluid excitations. For example, in a disc-shaped atomisation plate, it may be that only the innermost portion of the plate (i.e. the part furthest from the external force-applying structure) that vibrates with sufficient amplitude to generate the desired amount of fluid droplets or fluid excitations.

One way in which this problem may be mitigated to some extent is to drive the transducer with greater amplitude. This solution is however not ideal as it causes energy consumption to increase. Additionally, in some cases it may not be possible to drive the transducer with sufficient amplitude owing to other constraining factors, e.g. power supply constraints, inherent limitations of the piezoelectric material, overheating issues caused by increased power consumption, undesirably high noise levels, and the like.

Another way in which this problem may be mitigated to some extent is to tune the system such that the force applied by the clamp or other such forcing mechanism is carefully selected so that the damping effect is reduced. While this may be effective to some degree in reducing damping, this precise tuning significantly complicates design and manufacture of the transducer. It is also critical in such systems that the tuning is performed correctly, as incorrect clamping forces can actually increase the amount of damping to a level where the transducer is no longer capable of producing any useful fluid excitations whatsoever. Additionally, even in a correctly tuned system, over time the clamping forces may vary e.g. due to wear of the clamping mechanism leading to a reduction in efficiency of the transducer over time.

It would therefore be desirable to provide a head for a fluid excitation device that at least partially mitigates the above problems. In particular, would be desirable to provide a head for a fluid excitation device that is more efficient at converting input energy into useful output, e.g. droplets of fluid or excitations within a reservoir of fluid, where the head is relatively simple to design and manufacture.

SUMMARY OF THE INVENTION

Broadly speaking the invention provides a head for a fluid excitation device in which a transducer comprising a vibration generation portion and a fluid excitation portion is secured to a flexible substrate using an adhesive layer located between the vibration generation portion and the flexible substrate. An external force-applying structure is not needed to secure the vibration generation portion to the fluid excitation portion, removing a cause of significant vibration damping. Rather than damping the vibrations generated by the transducer, the flexible substrate instead itself moves in co-operation with the transducer, reducing damping effects. The design and manufacture of this arrangement is relatively simple and no complex tuning is required to ensure efficient operation over the entire operational life of the head. The head can be used in a fluid excitation device such as an atomiser or ultrasonic bath.

In a first aspect the invention provides a head for a fluid excitation device, the head comprising a transducer and a flexible substrate, wherein: the transducer comprises a vibration generation portion and a fluid excitation portion that is secured to the vibration generation portion in a manner that enables vibrations to be transmitted from the vibration generation portion to the fluid excitation portion; and the transducer is secured to the flexible substrate via a first adhesive layer that is positioned between the substrate and the vibration generation portion. Optional features of the first aspect are set out in the dependent claims. Further optional features of the invention are as follows:

The fluid excitation portion may be in the form of a sheet. The flexible substrate may be a printed circuit board. The flexible substrate may have a thickness in the range of 1 to 500 microns. The vibration generation portion may comprise an upper vibration generation portion and a lower vibration generation portion, wherein the fluid excitation portion may be sandwiched between the upper vibration generation portion and the lower vibration generation portion thereby securing the fluid excitation portion to the vibration generation portion In a second aspect the invention provides a fluid excitation device, comprising the head of the first aspect coupled to a fluid reservoir. The fluid excitation device may be an atomisation device or an ultrasonic bath.

BRIEF DESCRIPTION OF DRAWINGS

The invention is described with reference to the following figures which illustrate, by way of example only, particular embodiments of the invention.

DETAILED DESCRIPTION

In this patent specification, the following terms should be understood as indicated:

'Flexible' refers to the ability of a structure to bend without breaking, and particularly to bend easily; i.e. relatively little force need be applied to cause bending. As will be apparent from the disclosure below, a relevant property of a flexible structure in the context of the invention is that it causes relatively little damping of vibrations generated by a vibrating mechanism such as a transducer.

A 'fluid excitation device' is understood to encompass any device that seeks to generate excitations in a fluid. The excitations may themselves be the usable output of the device, as in the case of an ultrasonic bath for cleaning, for example, or the excitations may cause some other effect such as droplet generation at an interface between the fluid and air, as in the case of an atomiser, for example.

A 'head for a fluid excitation device' refers to the portion of the fluid excitation device that operates to generate excitations in the fluid. The fluid excitation device will comprise the head and typically at least some form of fluid reservoir.

Figure 1:
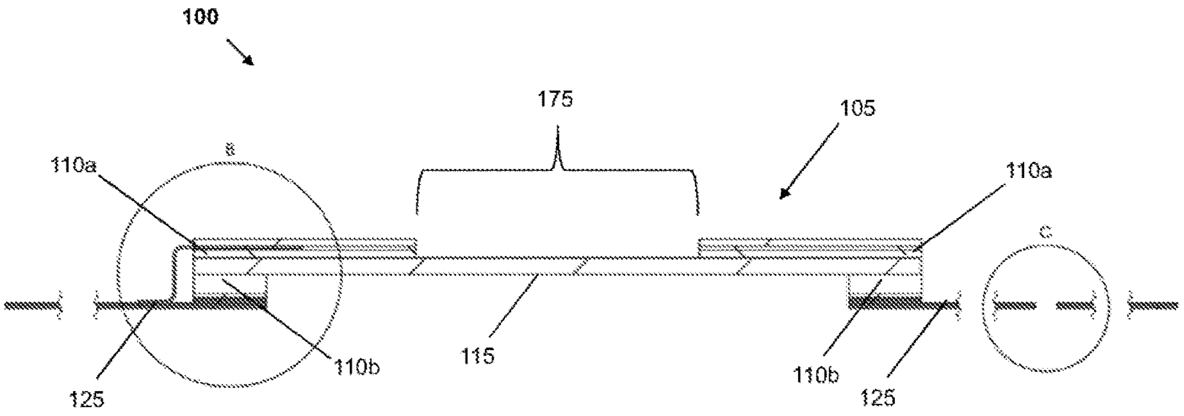
FIG. 1 shows a head for a fluid excitation device according to a first embodiment.
Figure 2:
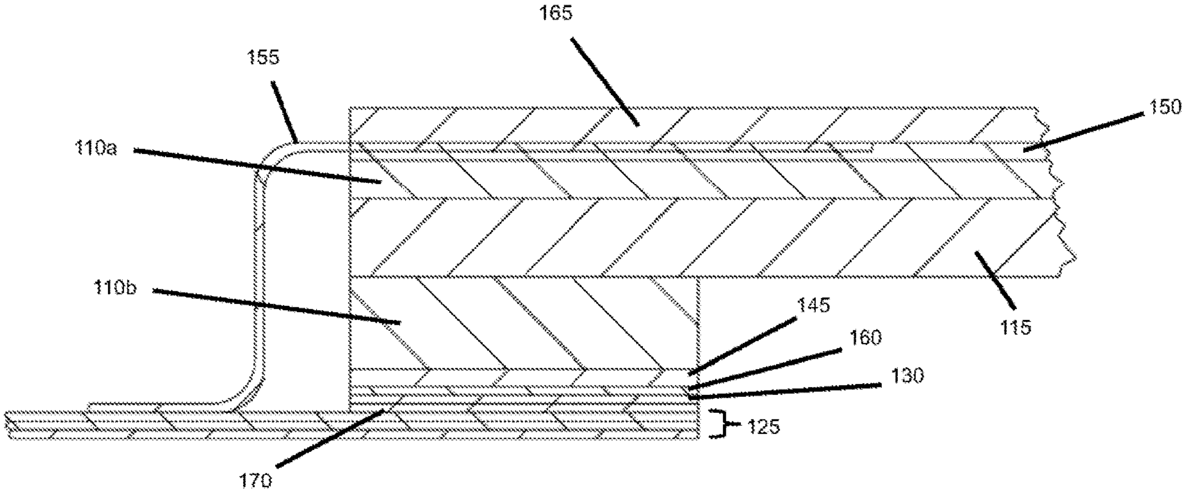
FIG. 2 shows a portion of the head of FIG. 1 in greater detail.
Figure 3:
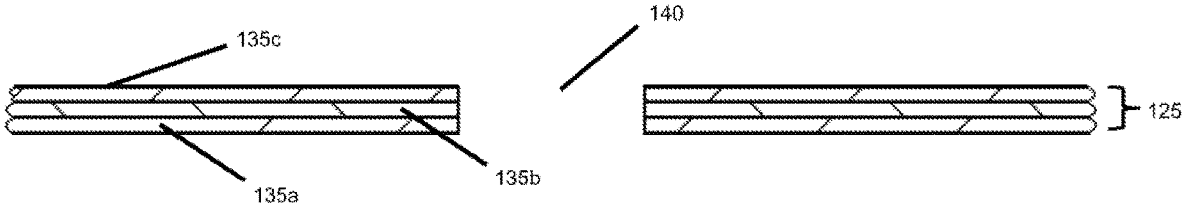
FIG. 3 shows another portion of the head of FIG. 1 in greater detail.

FIG. 1 provides a cross-sectional view of a head for a fluid excitation device 100 according to a first embodiment. FIG. 2 shows portion B of FIG. 1 in greater detail, and FIG. 3 shows portion C of FIG. 1 in greater detail.

Head 100 includes a transducer 105 that includes an upper vibration generation portion 110*a*, a lower vibration generation portion 110*b* and a fluid excitation portion 115. Upper vibration generation portion 110*a* and lower vibration generation portion 110*b* may be referred to collectively herein as 'the vibration generation portion'. In this embodiment the vibration generation portion is formed of a piezoelectric material and fluid excitation portion 115 is formed of a ceramic sheet or a metal sheet. These components are purely exemplary and the invention is not limited to any particular form of transducer so long as the transducer is capable of generating vibrations.

Head 100 is suitable for use in a fluid excitation device in which the objective is to generate waves within the fluid, e.g. an ultrasonic bath. The upper face of the fluid excitation portion 115 can be arranged in contact with fluid in a reservoir (not shown in FIG. 1) that is mounted above head 100. Vibrations are transmitted from the vibration generation portion to fluid excitation portion 115 and subsequently into the fluid where they manifest as waves within the fluid.

Fluid excitation portion 115 is secured to the vibration generation portion in a manner that enables vibrations to be transmitted from vibration generation portion 110 to fluid excitation portion 115. In the illustrated embodiment fluid excitation portion 115 is sandwiched between upper vibration generation portion 110*a* and lower vibration generation portion 110*b*. This arrangement secures the fluid excitation portion 115 between the two pieces of the vibration generation portion in a stable and robust manner. This arrangement also ensures that the fluid excitation portion 115 is in good physical contact with the vibration generation portion so as to enable good transmission of vibrations generated by the vibration generation portion to fluid excitation portion 115.

The invention is however not limited to the sandwiched arrangement shown in FIG. 1 and instead encompasses any securing mechanism that allows good vibrational transmission from the vibration generation portion to fluid excitation portion 115. For example the securing mechanism could comprise an adhesive layer that is positioned between an edge of the fluid excitation portion and an edge of the vibration generation portion so as to adhere these respective edges to one another. Other variants will be apparent to the skilled person having the benefit of the present disclosure.

Head 100 also includes a flexible substrate 125. In the illustrated embodiment flexible substrate 125 is a flexible printed circuit board, but this is not essential as the flexible substrate 125 can be any flexible sheet or other such flexible structure of material. An example of a suitable material for flexible substrate 125 is a polyamide plastic or polyimide plastic. Flexible substrate 125 can be of the order of tens of microns thick, e.g. in the range of 1 to 100 microns, or 1 to 500 microns. A preferred thickness for the flexible substrate is 20 microns. Thicknesses in the micron range have been found to offer desirable levels of flexibility that do not cause significant damping of vibrations generated by the vibration generation portion. However, the invention is not limited in this regard and any thickness of flexible substrate 125 is within the scope of the invention. For example, it is envisaged that the substrate could be significantly thicker, e.g. in the range of 500 microns to 10 mm thick.

Transducer 105 is secured to flexible substrate 125 via an adhesive layer 130 that is positioned between the substrate 125 and lower vibration generation portion 110*b* of the transducer 105 (see FIG. 2). Adhesive layer 130 can be formed from any suitable adhesive such as a glue or solder. Adhesive layer 130 is typically relatively thin, e.g. of the order of tens of microns thick, perhaps in the range of 1 to 100 microns thick. A preferred thickness for the adhesive layer is 20 microns but the invention is not limited in this regard and any thickness of adhesive layer 130 is within the scope of the invention. Adhesive layer 130 may be electrically conductive, e.g. in the case where the flexible substrate is a printed circuit board.

Referring specifically to FIG. 3, flexible substrate 125 is shown in greater detail. In the illustrated embodiment flexible substrate 125 is a flexible printed circuit board that comprises three layers—a lower flexible layer 135*a*, an electrically conductive middle layer 135*b* and an upper flexible layer 135*c*. That is, middle layer 130*b* is sandwiched between lower and upper layers 135*a*, 135*c*. The total thickness of the three layers in this embodiment is approximately 20 microns, with each layer being approximately 7 microns thick. Lower and upper flexible layers 135*a*, 135*c* can each be formed from a polyamide plastic or polyimide plastic. Middle layer 135*b* can comprise copper printed circuit board traces.

Optionally one or both of lower flexible layer 135*a* and upper flexible layer 135*c* may include a gap or hole that exposes electrically conductive middle layer 135*b* to fluid. If a coverlay is present on either or both of layers 135*a*, 135*c*, it will be appreciated that a corresponding gap or hole should be provided in the coverlay at the same place as the gap or hole in the flexible layer(s). The exposed part of electrically conductive middle layer 135*b* can be used as a sensor to sense properties of the fluid. Sensing can include: concentration sensing, pH sensing, pressure sensing, temperature sensing, and the like.

One or more fluid interaction components can be built into flexible substrate 125 to enable the component(s) to interact with the fluid in some manner. One example of a suitable component is a transducer that can be used to heat the fluid. Another example is a strain gauge that can be used as a pressure sensor. These and other components can be formed using appropriate shaped circuit traces in flexible substrate 125.

A membrane may be provided between the fluid and the sensor(s) and/or fluid interaction component(s) so as to protect the sensor(s) and/or fluid interaction component(s) from fluid if needed. The membrane can be made of any material that provides fluid protection whilst enabling the component that it protects to perform its function.

As these sensors and/or fluid interaction components are integral to flexible substrate 125 advantageously they can be electrically coupled directly to middle later 135*b* to provide power in a convenient manner. Additionally, the manufacture and assembly of the sensor(s) and/or fluid interaction component(s) is relatively simple as they are integrated into flexible substrate 125. Furthermore, the sensor and/or fluid interaction components and can be located very closely to the fluid. This allows highly accurate readings to be taken in the case of sensors and efficient operation in the case of fluid interaction components.

Advantageously the use of a flexible PCB means that power can be supplied to the vibration generation portion relatively easily and simply. Referring back to FIGS. 1 and 2, an optional first electrically conductive layer 145 can be provided between the flexible PCB and the lower vibration generation portion 110*b*. First electrically conductive layer 145 can be formed of any material that exhibits good electrical conduction at room temperature. A preferred material for first electrically conductive layer 145 is silver, but other materials such as copper can alternatively be used. First electrically conductive layer 145 electrically couples middle layer 135*b* of the flexible PCB to lower vibration generation portion 110*b*—to assist with this coupling, adhesive layer 130 is preferably also electrically conductive.

Optionally, as best shown in FIG. 2 a second electrically conductive layer 150 can be provided above upper vibration generation portion 110*a*. When both layers are present, the first and second electrically conductive layers sandwich the vibration generation portion as best shown in FIG. 2. Second electrically conductive layer can be formed of any material that exhibits good electrical conduction at room temperature. A preferred material for second electrically conductive layer 150 is silver, but other materials such as copper can alternatively be used.

Second electrically conductive layer 150 can be electrically coupled to an optional second flexible PCB 155 as shown in FIG. 2. Alternatively, a wire (not shown) can be used to electrically couple layer 155 to middle layer 130*b*. These electrical coupling arrangements are purely exemplary and alternative couplings such as one or more wires in place of layer 145 and/or 150 can alternatively be used.

Advantageously, the illustrated electrical coupling arrangement is compact, reliable and relatively simple to manufacture. This arrangement also avoids having significant length wires or leads which can be difficult to secure effectively, particularly in environments in which head 100 is envisaged for use where electrical circuitry must be insulated against fluid ingress.

Transducer 105 can optionally also include first and/or second protective layers 160, 165 to prevent corrosion of first and/or second conductive layers 145, 150 as may be caused by exposure to the atmosphere and/or fluid. If present, first protective layer 160 is positioned between first conductive layer 145 and adhesive later 130. If present, second protective layer 165 is positioned above second conductive layer 150 to act as a cap for transducer 105. Second protective layer 165 may also cover at least a portion of second PCB 155 if present, as is shown in FIG. 2. The or each protective layer 160, 165 can be made of any material that affords protection against corrosion, with enamel being a suitable and preferred material.

In the case where flexible substrate 125 is a PCB, transducer 105 can optionally also include a coverlay 170 that is located between the adhesive layer 130 and the flexible PCB. Coverlays per se are known in the art and therefore coverlay 170 is not described in detail here. It is sufficient to understand that coverlay 170 provides a protective layer for the PCB and specifically the circuitry of the PCB. A coverlay may additionally or alternatively be provided on the lower face of lower flexible layer 135*a*.

As can be best seen in FIG. 1, fluid excitation portion 115 includes a fluid contact region 175 that is exposed or open, i.e. it is not covered by any part of the vibration generation portion or flexible substrate 125. This fluid contact region 175 is the region in which fluid excitation occurs as, in use, the fluid contact region 175 is in contact with fluid and thus is capable of causing excitations in the fluid.

In known arrangements that involve clamping or other such mechanically-based securing techniques, significant damping is experienced across a relatively large part of the total area of the equivalent of fluid contact region 175. This significantly reduces the total useful output of the fluid contact region in known arrangements.

In contrast, in the case of the invention the use of flexible substrate 125 and adhesive layer 130 means that vibrations in the fluid contact region 175 are of sufficient amplitude to generate useful fluid excitations across a large fraction of the total area of fluid contact region 175, e.g. 80%, 85%, 90%, 95% or more of the total area of fluid contact region 175. Here, useful fluid excitations are excitations that result in a desired output, e.g. waves in the fluid that are capable of effecting cleaning in the case of an ultrasonic bath, or droplets in the case of an atomiser. In this way the efficiency of the invention is greater than known clamping-type arrangements. In some cases known clamping-type arrangements can be precisely tuned such that they may have an efficiency approaching that of the invention. However, the tuning process is time-consuming and complicated and also places significant limitations on design freedom. In such cases the invention provides at least equivalent efficiency, if not greater efficiency, with significantly reduced manufacturing complexity and improved design freedom.

Additionally, since the invention puts a greater proportion of the total area of fluid contact region 175 to useful effect, the amount of useful output per unit time can be correspondingly increased. For example, the invention may be able to generate significantly more fluid excitations per unit time than known clamping arrangements. This can result in equivalent cleaning levels in a shorter time in the case of an ultrasonic bath, or a greater droplet generation rate in the case of an atomiser.

Transducer 105 can take any shape, but it is preferred that the vibration generation portion is ring-shaped and fluid excitation portion 115 is shaped so as to fit within a central hole of the ring. Here, 'ring-shaped' includes both circular and elliptical cross-sections. This produces an arrangement with a circular or elliptical fluid contact region 175. The invention is however not limited in this regard and fluid contact region 175 can alternatively be any other shape, e.g. rectangular, square, etc.

In the illustrated embodiment flexible substrate 125 includes an optional fluid test hole 140 in its structure. The fluid test hole 140 enables a testing apparatus, e.g. a probe, to be guided through the substrate 125 and into a fluid reservoir (not shown in FIG. 1, 2 or 3) to enable testing of the fluid within the reservoir. The testing can include performance of any desirable test, e.g. pH testing, concentration testing, temperature testing, and the like, and any combination thereof. Advantageously, fluid test hole 140 enables testing to be performed without detaching the substrate from the fluid reservoir.

As shown, the fluid test hole 140 is located beyond an outer edge of the transducer 105. This location is preferred such that hole 140 does not interfere in the operation of transducer 105. The location of hole 140 is however not limited to this and hole 140 can be located anywhere in substrate 125. Hole 140 is sized to enable a testing apparatus to gain access to fluid in the fluid reservoir, such that the size of the hole will vary in dependence on the nature of the testing apparatus. For example, in the case of a testing apparatus having a probe, hole 140 can have a width that is slightly greater than the width of the probe.

Although only a single fluid test hole is shown in FIGS. 1 and 3, the invention is not limited in this regard and multiple fluid test holes can be present. Each hole may be suitable for use in combination with a different one of a set of test apparatuses, e.g. with complimentary dimensions and/or positioning in substrate 125.

Figure 4:
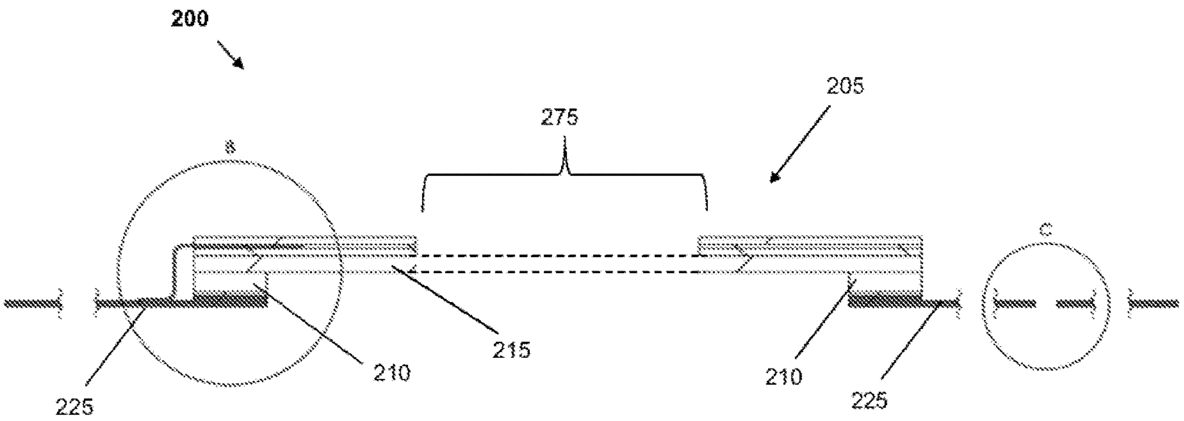
FIG. 4 shows a head for a fluid excitation device according to a second embodiment.

Referring now to FIG. 4, a head 200 for a fluid excitation device in accordance with a second embodiment is shown in cross-section. Details B and C are identical to that of the first embodiment and therefore reference can be made to FIGS. 2 and 3, respectively. Elements of FIG. 4 are identical to elements of the first embodiment except as set out below. Corresponding elements between the two embodiments have the same suffix to enable easy cross-referencing.

The difference between head 100 and head 200 is that fluid excitation portion 215 of head 200 includes a plurality of holes in fluid contact region 275, e.g. by forming a mesh in fluid contact region 275. Head 200 is thus suitable for use in a fluid excitation device in which the objective is to generate droplets of fluid, e.g. an atomisation device, as the plurality holes in fluid excitation portion 275 can enable fluid from a reservoir (not shown in FIG. 4) to pass through fluid contact region 275 (e.g. via pumping, or via capillary action if a wick is present) and generate droplets via the vibrations transmitted to the fluid excitation portion 215.

In this case, the reservoir would tend to be located below head 200 in fluid-tight contact with flexible substrate 215. The fluid excitation portion may be a micro-porous mesh in this embodiment.

Preferably the plurality of holes in fluid contact region 275 extend across at least a substantial portion of the width of fluid contact region 275, e.g. holes are provided having positions lying across at least 80%, 85%, 90%, 95% of the width of fluid contact region 275. Distributing holes across a significant fraction of the width of fluid contact region can advantageously increase the total amount of droplets generated per unit time. This is made possible by the use of flexible substrate 225 and adhesive 130, which together minimise damping that would otherwise be present in a known clamping arrangement and which allow vibrations of an amplitude that is capable of generating droplets to persist across at least a large fraction of the width of fluid contact region 275.

The size and shape of each hole and the spacing between adjacent holes is not essential to the working of the invention and can be selected according to the specifics of the design at hand. It will be appreciated that the shape and dimensions of each hole will affect the size of droplets that are generated. The spacing between adjacent holes will affect the hole density in fluid contact region 275, with a corresponding change in the amount of droplets generated per unit time.

In known arrangements the o-ring or other clamping component (see FIG. 5, right-hand side) create a trap that tends to retain bubbles created during operation of the transducer close to the fluid contact region. This is undesirable as it can disrupt fluid flow through the holes in the fluid contact portion.

Figure 8:
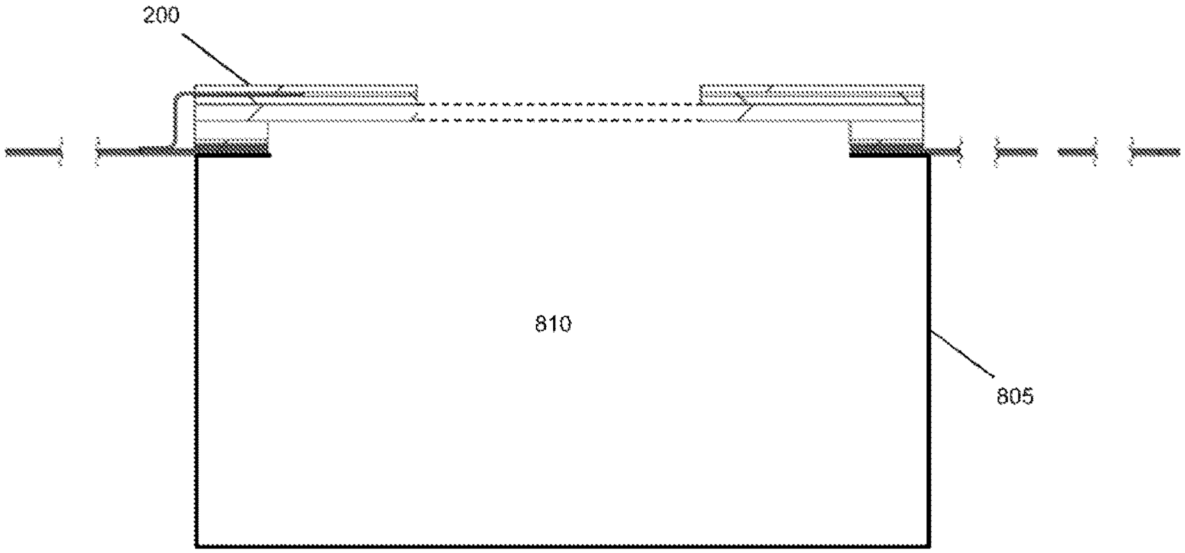
FIG. 8 shows the head for a fluid excitation device of FIG. 2 in combination with a fluid reservoir.

As can be seen from FIGS. 4 and 8, there is little or no protrusion of the fluid excitation portion 215 into the fluid, particularly in fluid contact region 275. This means that any bubbles that are generated in the fluid during operation of the transducer are easily removed from fluid contact region 275 via fluid flow.

Disruption of fluid flow through the holes in fluid contact region 275 is therefore advantageously at least reduced if not virtually eliminated.

Figure 5:
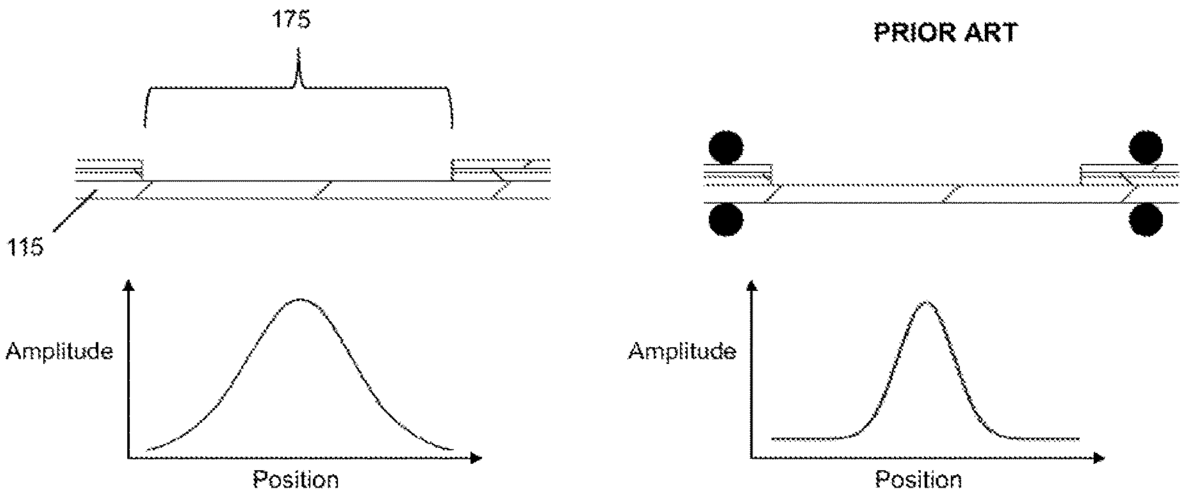
FIG. 5 shows a comparison between a head for a fluid excitation device according to the invention and a prior art head.

FIG. 5 provides an illustration of a distinction between the invention and known injection heads that make use of clamps or an equivalent mechanical forcing arrangement. The invention is shown on the left of FIG. 5 and it can be seen that the amplitude of vibrations in the fluid excitation portion is relatively high (i.e. large enough to be usable to generate useful excitations in a fluid) across a large fraction of the width of the fluid contact region. In contrast, in the known arrangement shown on the right which employs clamps (shown as dark circles), the amplitude of vibrations in expected to vary significantly across the width of the fluid contact region. Specifically, vibration amplitude is expected to reduce significantly as distance to the clamps decreases. This makes the outer regions of the fluid excitation portion of the prior art unusable for generation of fluid excitations, whereas the invention can make use of a greater fraction of the width of the fluid contact region for useful excitation generation.

While FIG. 5 shows only head 100, it will be appreciated that the illustration of FIG. 5 applies equally well to head 200. The amplitude vs. position graphs shown in FIG. 5 are purely illustrative and in practice the exact relationship between position and amplitude may take a different form than that shown. What is consistent across all implementations of the invention is that useful levels of excitation are produced across more of the area of the fluid excitation region than in known arrangements.

Figure 6:
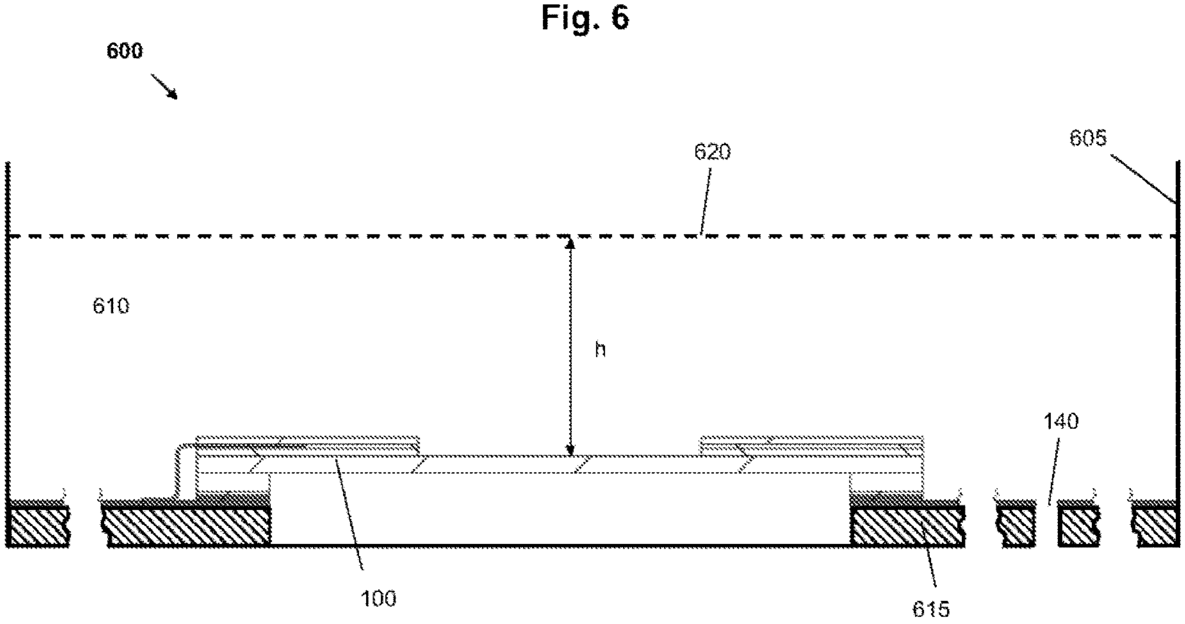
FIG. 6 shows the head for a fluid excitation device of FIG. 1 in combination with a fluid reservoir.

FIG. 6 shows in cross-section a fluid excitation device 600 that comprises the head 100 of the first embodiment and a reservoir 605. Reservoir 605 is essentially a container capable of retaining a fluid 610. Reservoir 605 can be made of any material capable of retaining fluid 610 and resisting any damaging effects that fluid 610 may have, e.g. corrosion, warping, etc. Typically reservoir 605 is made of plastic or metal. Fluid 610 can be any fluid that is of interest in the intended use for fluid excitation device 600, including but not limited to: a disinfecting fluid such as hydrogen peroxide solution, water, a lubricant, a solvent for cleaning, and others.

Head 100 is mounted to reservoir 605 by a mounting layer 615. The mounting layer can be formed of an adhesive material such as glue or solder and can create a fluid-tight seal between head 100 and reservoir 605. If fluid testing hole 140 is present as shown, a corresponding hole can be formed in mounting layer 615. A cap or other such fluid-tight sealing member may be provided to plug the hole in mounting layer 615 when fluid testing is not being performed.

Fluid excitation device 600 is suitable for use as either an atomiser or a cleaning unit, e.g. an ultrasonic bath. The primary function of fluid excitation device 600 is dictated by the height of fluid 610 that is maintained above the fluid contact region 175 of head 100.

Within a certain range of heights, excitations in the fluid caused by head 100 will have sufficient energy when reaching fluid-atmosphere interface 620 to generate droplets of fluid at this interface. The droplets are ejected from fluid 610 into the air directly above. Air can be blown across the surface of fluid 620 to capture these ejected droplets and transport them to a desired location, e.g. a surrounding room in the case of disinfection or humidification, or a pipe or similar in the case of lubrication. In this case a fluid inlet (not shown) may be provided to top up fluid 610 as it is depleted via droplet generation so as to maintain the height h approximately constant over time.

In the case where the fluid height h exceeds the range for droplet generation, excitations in the fluid caused by head 100 will not have sufficient energy when reaching fluid-atmosphere interface 620 to generate droplets of fluid. However, the excitations in the fluid themselves can be used to clean objects placed within reservoir 605, and in this case fluid excitation device 600 functions as an ultrasonic bath. Ultrasonic baths per se are known and so further description of an ultrasonic bath is not necessary here.

In addition to the fluid height h, other parameters may be adjusted to alter the operation of fluid excitation device 600. An example of such a parameter is the frequency and/or amplitude at which the vibration generation portion is driven. Control circuity (not shown) can be provided to generate a control signal that drives the vibration generation portion and adjust such parameters as required.

Figure 7:
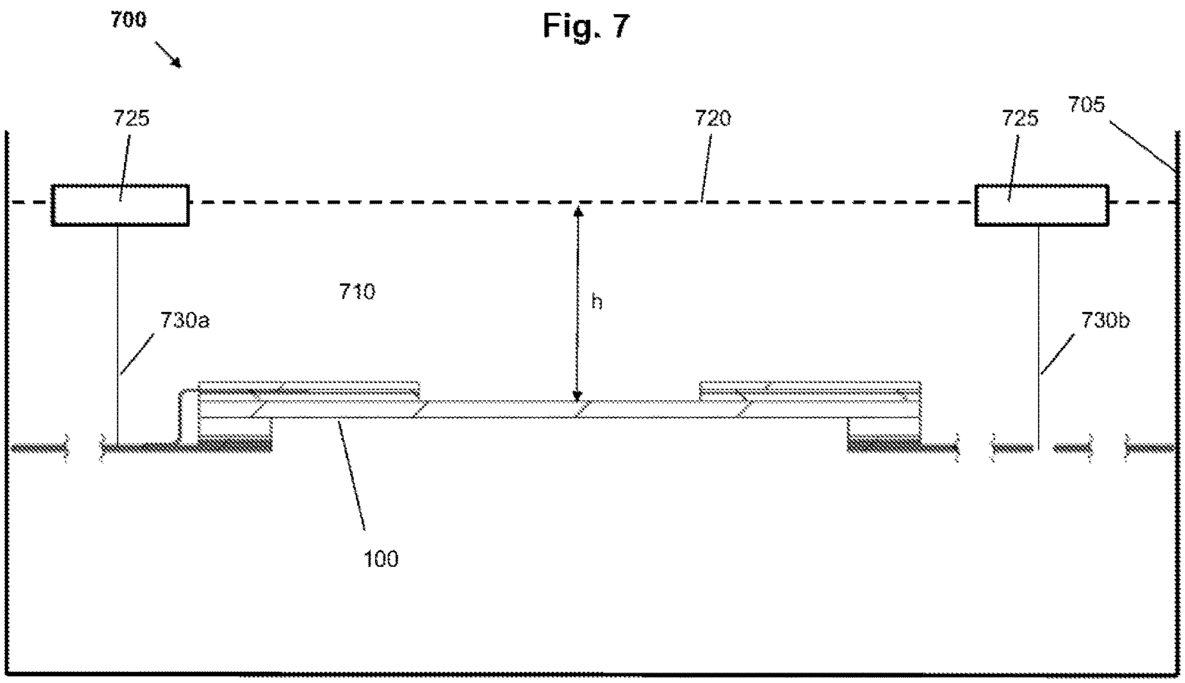
FIG. 7 shows the head for a fluid excitation device of FIG. 1 in combination with a flotation device and a fluid reservoir.

Another fluid excitation device 700 according to the invention is shown in FIG. 7. Fluid excitation device 700 is an atomisation device that is capable of maintaining a constant height h between the fluid excitation portion of head 100 and the atmosphere-fluid interface 720 without continual replenishment of fluid lost due to droplet production. This advantageously means that real time or near real time control of fluid levels in reservoir 705 is not needed; instead, reservoir 705 need only be filled from time to time. The constant height means that droplet production is reliable in terms of rate of generation and/or average droplet size.

In the embodiment of FIG. 7 a flotation device is provided to suspend head 100 within fluid 710 at a constant height h with respect to the atmosphere-fluid interface 720. The flotation device can take many forms and in the illustrated embodiment the flotation device comprises a ring 725 and first and second anchoring lines 730*a*, 730*b* that secure the ring 725 to the flexible substrate of head 100. Ring 725 can be formed of any material that floats on the surface of fluid 710 and should be dimensioned such that it is capable of floating when supporting the weight of head 100. An exemplary material for ring 725 is polyethylene foam, but the invention is not limited in this respect and many other suitable materials for ring 725 will be apparent to the skilled person having the benefit of the present disclosure.

Anchoring lines 730*a*, 730*b* can be formed of any material that is capable of reliably and robustly attaching the flexible substrate of head 100 to ring 725. An exemplary material is a monofilament synthetic fibre such as monofilament nylon, but the invention is not limited in this respect and many other suitable materials for anchoring lines 730*a*, 730*b* will be apparent to the skilled person having the benefit of the present disclosure. It will also be appreciated that fewer or more anchoring lines than two can be provided, e.g. one anchoring line, three anchoring lines, four anchoring lines, etc. The length of the or each anchoring line is set such that the height h between head 100 and interface 720 is constant as droplets are produced and the level of fluid 710 correspondingly drops.

An adjustment mechanism (not shown) may be provided to enable the length of anchoring lines 730*a*, 730*b* to be altered so as to change height h. This enables fine tuning of the fluid excitation mechanism and may be particularly useful where the fluid excitation device 700 is used as an atomiser.

It will be appreciated that after some time of use, the level of fluid 710 will drop sufficiently that either head 100 comes into contact with the bottom of reservoir 705 or the distance between the topmost part of the sides of reservoir 705 and interface 720 is too great for droplets to be effectively caught by air blown across the surface of fluid 710. At this point fluid 710 can be topped up, e.g. via a fluid inlet (not shown). A sensor (not shown) may be provided to detect the current position of head 100 and cause fluid 710 to be topped up as needed and based on the detected positon of head 100.

Advantageously head 100 and the flotation device can be provided as a single unit that is capable of being placed in any reservoir. This provides flexibility in deployment as existing reservoirs can be used without modification. Head 100 and the flotation device can also be easily removed from reservoir 705 to enable repairs or modifications to the components of head 100 to be carried out easily. Reservoir 705 can also be cleaned whilst the head 100 is removed.

FIG. 8 shows another fluid excitation device 800 according to an embodiment of the invention. Fluid excitation device 800 makes use of head 200 and is suitable for use as an atomiser. Unlike devices 600 and 700, fluid excitation device 800 has a reservoir 805 that is located beneath head 200. Fluid is moved from reservoir 805 via the holes in the fluid excitation portion of head 200, e.g. directly via the pumping action of the fluid excitation portion of head 200 or via a capillary if a wick is present. Droplets are thus generated in the region above the fluid contact region, and can be transported from this region to any desirable location by directing an air flow across the upper surface of head 200.

A fluid inlet (not shown) can be provided in reservoir 805 to enable topping up of reservoir 805 with additional fluid to compensate for fluid lost from reservoir 805 as droplets.

Flexible membrane 225 can also function as a fluid-tight seal between head 200 and reservoir 805. This may be achieved by providing an adhesive sealing layer between the walls of reservoir 805 and the lower surface of flexible membrane 225. This arrangement advantageously prevents fluid leakage without significant damping of vibrations in the fluid excitation portion of head 200.

Numerous modifications and adaptations to the embodiments disclosed herein will be apparent to a skilled person having the benefit of the present disclosure. All such modifications and adaptations are also within the scope of the invention as defined by the appended claims.

What is claimed is:

1. A fluid excitation device for use with a disinfecting fluid, comprising a head for generating excitations in the disinfecting fluid, the head coupled to a fluid reservoir, wherein:
- the head comprises a transducer and a flexible substrate, wherein:
  - the transducer comprises a vibration generation portion and a fluid excitation portion in the form of a sheet lying in one plane that is secured to the vibration generation portion in a manner that enables vibrations to be transmitted from the vibration generation portion to the fluid excitation portion;
  - the fluid excitation portion includes an exposed or open fluid contact region that is planar;
  - the transducer is secured to the flexible substrate via a first adhesive layer that is positioned between the substrate and the vibration generation portion;
  - the flexible substrate is a printed circuit board; and
  - the flexible substrate comprises an opening that exposes the fluid contact region of the fluid excitation portion, and further comprises at least one fluid test hole, separate to the opening, to enable testing of fluid in the fluid reservoir;
- wherein a fluid-tight seal is formed between the head and the reservoir, the fluid-tight seal being formed at least in part by an edge of the fluid reservoir being arranged in sealing contact with the flexible substrate.

2. The fluid excitation device of claim 1, wherein the vibration generation portion comprises an upper vibration generation portion and a lower vibration generation portion, and wherein the fluid excitation portion is sandwiched between the upper vibration generation portion and the lower vibration generation portion thereby securing the fluid excitation portion to the vibration generation portion.

3. The fluid excitation device of claim 1, wherein the fluid excitation portion is secured to the vibration portion via an adhesive layer positioned between an edge of the fluid excitation portion and an edge of the vibration generation portion.

4. The fluid excitation device of claim 1, wherein the vibration generation portion comprises a piezoelectric material and the fluid excitation portion comprises a ceramic sheet or a metal sheet.

5. The fluid excitation device of claim 1, wherein the vibration generation portion is ring-shaped and wherein the fluid excitation portion is located within a central hole of the ring.

6. The fluid excitation device of claim 1, further comprising an electrically conductive layer that is positioned between the vibration generation portion and the first adhesive layer.

7. The fluid excitation device of claim 1, wherein the head further comprises first and second electrically conductive layers, wherein the first and second electrically conductive layers are each electrically coupled to the printed circuit board.

8. The fluid excitation device of claim 7, wherein the first electrically conductive layer is positioned between the vibration generation portion and the first adhesive layer, and the second electrically conductive layer is positioned on another surface of the vibration generation portion such that the vibration generation portion is sandwiched between the first and second electrically conductive layers.

9. The fluid excitation device of claim 1, wherein the device is an atomisation device.

10. The fluid excitation device of claim 9, wherein the fluid excitation portion includes a plurality of holes and the fluid reservoir is mounted below the head such that vibrations in the fluid excitation portion draw fluid from the fluid reservoir through the plurality of holes to generate droplets at an upper surface of the fluid excitation portion.

11. The fluid excitation device of claim 10, wherein the plurality of holes are formed by a mesh.

12. The fluid excitation device of claim 1, wherein the fluid reservoir is mounted above the head such that vibrations in the fluid excitation portion are capable of exciting corresponding vibrations in a fluid in the fluid reservoir to generate droplets of the fluid.

13. The fluid excitation device of claim 1, wherein the device is an ultrasonic bath, and wherein the fluid reservoir is mounted above the head such that vibrations in the fluid excitation portion are capable of exciting corresponding vibrations in a fluid in the fluid reservoir.

14. The fluid excitation device of claim 1, further comprising a flotation device coupled to the head.

15. The fluid excitation device of claim 1, wherein—the fluid contact region is in contact with fluid in the fluid excitation device.

16. The fluid excitation device of claim 1, wherein the head is mounted to the fluid reservoir by a mounting layer.

17. The fluid excitation device of claim 1, wherein the flexible substrate has a thickness in the range of 1 to 500 microns.

* * * * *